United States Patent
Leduc et al.

(10) Patent No.: US 11,737,012 B2
(45) Date of Patent: Aug. 22, 2023

(54) MAINTAINING ACCESS TO SERVICES VIA SIM CARD

(71) Applicant: Apple Inc., Cupertino, CA (US)

(72) Inventors: Nelson M. Leduc, San Jose, CA (US); Lauren E. Tappana, San Francisco, CA (US); Nicholas Joseph Circosta, Mountain View, CA (US); Andrew J. Daley, Santa Clara, CA (US); Guozhi Huang, San Mateo, CA (US); Daniel B. Pollack, Cupertino, CA (US); Robert D. Butler, Middletown, DE (US); Vitalii Kramar, Mountain View, CA (US)

(73) Assignee: Apple Inc., Cupertino, CA (US)

(*) Notice: Subject to any disclaimer, the term of this patent is extended or adjusted under 35 U.S.C. 154(b) by 159 days.

(21) Appl. No.: 17/316,659

(22) Filed: May 10, 2021

(65) Prior Publication Data

US 2021/0392570 A1    Dec. 16, 2021

Related U.S. Application Data

(60) Provisional application No. 63/039,922, filed on Jun. 16, 2020.

(51) Int. Cl.
*H04W 8/22* (2009.01)
*H04W 48/16* (2009.01)
(Continued)

(52) U.S. Cl.
CPC ....... *H04W 48/16* (2013.01); *H04M 3/42008* (2013.01); *H04W 4/12* (2013.01);
(Continued)

(58) Field of Classification Search
CPC ....... H04W 48/16; H04W 4/12; H04W 8/183; H04W 8/22; H04W 12/069; H04W 8/265;
(Continued)

(56) References Cited

U.S. PATENT DOCUMENTS

2014/0228039 A1* 8/2014 Zhao ............... H04B 1/3816
455/458
2017/0317990 A1* 11/2017 Kim ............... H04W 4/60
(Continued)

FOREIGN PATENT DOCUMENTS

CN          110324873          10/2019

OTHER PUBLICATIONS

International Search Report and Written Opinion from PCT/US2021/032179, dated Sep. 2, 2021, 15 pages.

*Primary Examiner* — Julio R Perez
(74) *Attorney, Agent, or Firm* — BakerHostetler

(57) ABSTRACT

Implementations of the subject technology provide for storing a temporary certificate on a mobile device for accessing services in association with a primary number. A device determines that a first subscriber identity module (SIM) card, previously used by the device, is not available for use by the device. The device determines that a second SIM card is available for use by the first device within a predetermined time period after the first SIM card is determined to be not available for use by the device. The device confirms that a communication identifier of the first SIM card is strongly tied to a user account associated with the device. The device stores a temporary certificate that attests to continued ownership of the communication identifier by the device and allows the device to access at least one service in association with the communication identifier.

20 Claims, 8 Drawing Sheets

(51) Int. Cl.
*H04W 8/18* (2009.01)
*H04W 12/069* (2021.01)
*H04M 3/42* (2006.01)
*H04W 4/12* (2009.01)
*H04W 8/26* (2009.01)
*H04W 88/06* (2009.01)

(52) U.S. Cl.
CPC ............ *H04W 8/183* (2013.01); *H04W 8/22* (2013.01); *H04W 12/069* (2021.01); *H04W 8/265* (2013.01); *H04W 88/06* (2013.01)

(58) Field of Classification Search
CPC ....... H04W 88/06; H04W 12/06; H04W 4/60; H04M 3/42008; H04M 3/42297; H04L 63/0823
See application file for complete search history.

(56) References Cited

U.S. PATENT DOCUMENTS

| | | |
|---|---|---|
| 2020/0092711 A1 | 3/2020 | Chen et al. |
| 2021/0392570 A1* | 12/2021 | Leduc ............... H04M 3/42008 |
| 2022/0295261 A1* | 9/2022 | Krishnamoorthy ..... H04W 8/18 |

* cited by examiner

MAINTAINING ACCESS TO SERVICES VIA SIM CARD

CROSS REFERENCE TO RELATED APPLICATIONS

This application claims the benefit of priority to U.S. Provisional Patent Application No. 63/039,922, entitled "MAINTAINING ACCESS TO SERVICES VIA SIM CARD," filed on Jun. 16, 2020, the disclosure of which is hereby incorporated herein in its entirety.

TECHNICAL FIELD

The present description relates generally to wireless communications between electronic devices, and more particularly to enabling the use of a communication identifier from a previously used subscriber identity module (SIM) card to access a service.

BACKGROUND

While travelling or visiting a foreign country, a user may obtain a subscriber identity module (SIM) card for a telecommunications network in the foreign country to obtain wireless communications service. By replacing the currently installed SIM card on the mobile device, a user can continue to use their own mobile device while accessing a foreign telecommunications network. However, since the previous SIM card is no longer installed on the mobile device, the user may lose access to various services that are associated with the previous SIM card, such as messaging and video call applications.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

Figure 1:
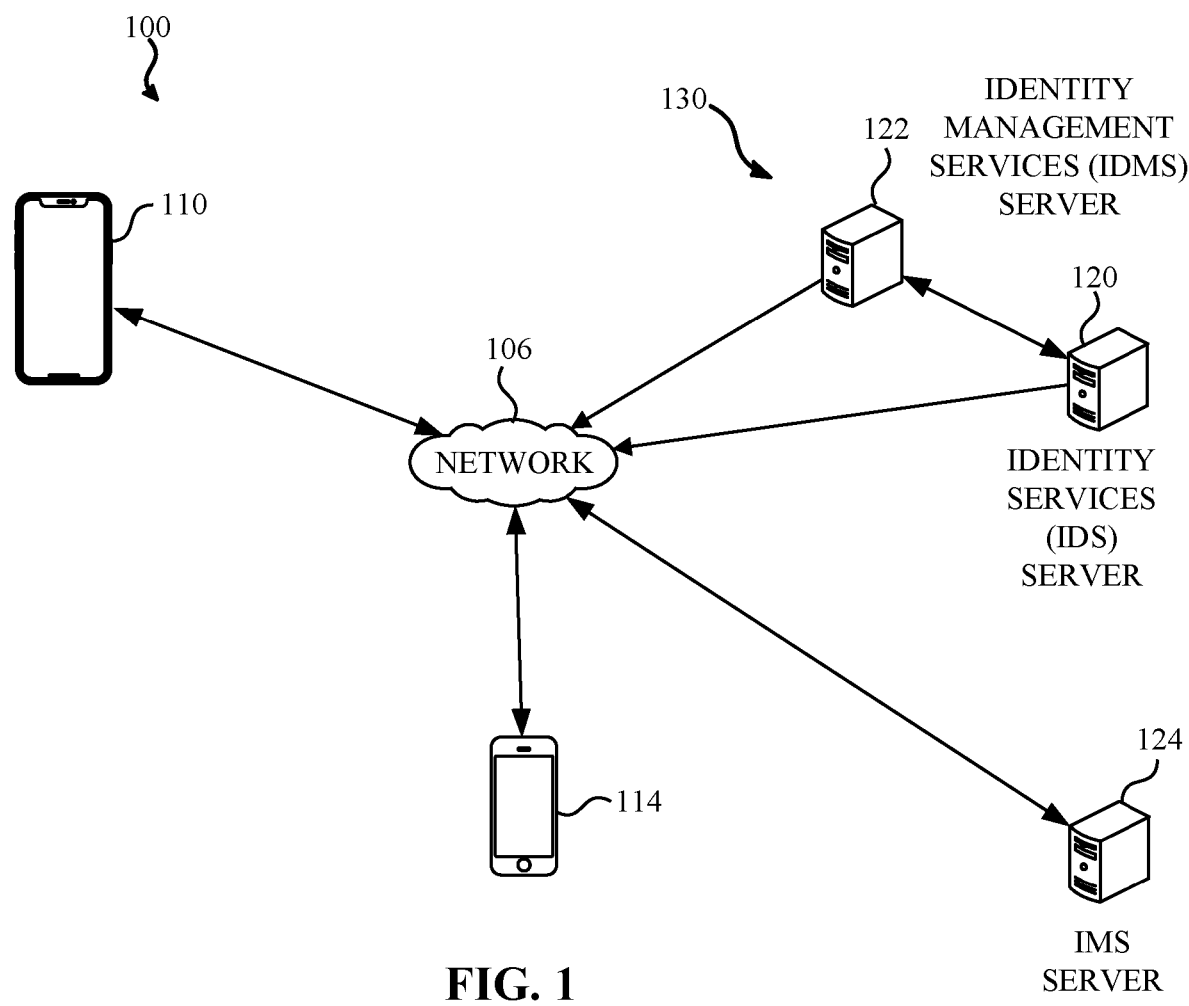
FIG. 1 illustrates an example network environment in which a system for providing a temporary certificate to a device for accessing services in association with a primary number may be implemented in accordance with one or more implementations.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

As described above, when a user removes a SIM card and installs a new SIM card into a mobile device, the user may lose access to services through the previous SIM card, such as messaging and video calls. This may present an issue when the new SIM card is only temporary, such as when renting/purchasing a SIM card while travelling, and the user does not wish to permanently change their phone number. One approach may be to provide the mobile device with multiple SIM card slots, such as dual-SIM card slots. However, this approach may not be preferred due to manufacturing cost, device form-factor, battery life, and other considerations. Further, the mobile device may still only access services through the currently active SIM card even in a dual-SIM slot configuration. Another approach may be to use eSIM cards. However, this requires both device level support and interaction with a mobile network carrier for setup. Further, some device implementations may only support up to a single active eSIM at a time. Accordingly, there is a need for supporting access to services associated with a previously used SIM card.

The subject technology provides for storing a temporary certificate on a mobile device for accessing services in association with a primary number. A communication identifier (e.g., an Integrated Circuit Card ID (ICCID), an embedded Universal Integrated Circuit Card ID (eUICCID), an International Mobile Subscriber Identity (IMSI) number, or a Mobile Station International Subscriber Directory Number (MSISDN) number) associated with a previously used SIM card is identified to be strongly associated with a user account of the mobile device. The communication identifier for the SIM card may be strongly associated with the user account if, for example, communication identifier satisfies an association criteria with the user account (e.g., by having been registered in association with the user account, having been used in a two-factor authentication operation for accessing the user account, and/or having been associated with the user account for a predetermined period of time). For example, the user account may be registered at one or more servers used to login and authenticate a specific user of the mobile device to perform local or cloud data synchronization, access storefronts for music, videos, and applications, purchase digital or physical goods and services, find and disable lost devices, submit support requests, and perform other tasks. Once the communication ID is identified to be strongly associated with the user account associated with the mobile device, a temporary certificate attesting to the association is stored on the mobile device. The temporary certificate may be generated remotely.

When the mobile device is requested to prove ownership of the primary number, the temporary certificate can be provided to attest to continued ownership of the primary number after the previously used SIM card is not available to the mobile device. In the context of a physical SIM card, unavailability may correspond to the previously used SIM card being physically removed from the SIM card slot of the mobile device. In the context of an eSIM card, unavailability may correspond to the previously used eSIM card being rendered inactive due to, e.g. another eSIM card being selected or preferred for active use. Thus, the subject technology allows a user to advantageously continue using the primary number to access various services such as messaging and video calls even when a different SIM card is inserted or a different eSIM card is activated by the mobile device. In some implementations, the mobile device may also enter into a dual-SIM operation mode in which the communication identifiers of both the previously used SIM card and the currently available SIM card or active eSIM card may be used concurrently for accessing the services.

FIG. 1 illustrates an example network environment 100 in which a system for providing a temporary certificate to a device for accessing services in association with a primary number may be implemented in accordance with one or more implementations. The temporary certificate may include, for example, a communication ID, a user account ID, and/or a validity period, and the temporary certificate may be signed by a remote server, as described in FIG. 3 and FIG. 4. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The network environment 100 includes an electronic device 110, an electronic device 114, an identity services (IDS) server 120, an identity management services (IDMS) server 122, and an IP multimedia subsystem (IMS) server 124. For explanatory purposes, the network environment 100 is illustrated in FIG. 1 as including the electronic devices 110, 114, the IDS server 120, the IDMS server 122, and the IMS server 124; however, the network environment 100 may include any number of electronic devices and any number of servers or a data center including multiple of the servers in a group of servers 130. Moreover, as further illustrated, some of the servers in the group of servers 130 may be communicatively coupled with another server within the group of servers 130 to facilitate sending and/or receiving messages to and from each server as discussed further herein.

The network 106 may communicatively (directly or indirectly) couple, for example, the electronic device 110 with the IDS server 120, the IDMS server 122, and/or the IMS server 124. In one or more implementations, the network 106 may be an interconnected network of devices that may include, or may be communicatively coupled to, the Internet.

The electronic device 110 may include a touchscreen and may be, for example, a smartphone that includes a touchscreen, a portable computing device such as a laptop computer, a peripheral device (e.g., a digital camera, headphones), a tablet device, a wearable device such as a watch, a band, and the like, any other appropriate device that includes, for example, one or more wireless interfaces such as cellular radios, near-field communication (NFC) radios, WLAN radios, Bluetooth radios, Zigbee radios, and/or other wireless radios. In FIG. 1, by way of example, the electronic device 110 is depicted as a mobile smartphone device. In one or more implementations, the electronic device 110 may be, and/or may include all or part of, the electronic device discussed below with respect to the electronic system discussed below with respect to FIG. 8.

In one or more implementations, one or more of the electronic devices 110, 114, such as the electronic device 110, may not include cellular circuitry (or a cellular interface) for communicating with cellular network equipment, such as the IMS server 124. In this instance, the electronic device 110 may utilize Wi-Fi calling to register for services, such as IMS services, via the network 106, so that the electronic device 110 is directly reachable by the IMS server 124 for call routing.

For explanatory purposes, a communication session is primarily described herein as being a cellular communication session, e.g. a cellular phone call. However, a communication session may be, for example, a video call, a Wi-Fi call, a VoIP call, an intercom call, a push-to-talk (PTT) call, a D2D call, or generally any communication between two or more of the electronic devices 110 and 114.

The IDS server 120 and/or the IDMS server 122 may form all or part of a network of computers or the group of servers 130, such as in a cloud computing or data center implementation. The IDS server 120 and/or the IDMS server 122, for example, may provide identity services and may manage credentials associated with the electronic device 110. Further, the IDS server 120 and/or the IDMS server 122 may provide various authentication and registration services, such as certificate signing for a communication ID for a primary number associated with a user account, in response to requests from the electronic device 110 as discussed further below.

In an example, the IDS server 120 and/or the IDMS server 122, which may form the group of servers 130, may be associated with a particular service provider or entity, e.g. different from a cellular service provider. Moreover, the IDS server 120 can be combined with the IDMS server 122 in at least an implementation, and/or one or more of the IDS server 120 and/or the IDMS server 122 may not be included in one or more implementations. In one or more implementations, one or more of the electronic devices 110, 114 may be associated/registered with a user account with the service provider. For example, the electronic devices 110, 114 may each be associated with a same user account, or one or more of the electronic devices may be associated with a different user account.

The IMS server 124, in an example, provides access to IMS services including functionality related to an IMS gateway that enables the electronic device 110 to send or receive IP multimedia services to or from a telecommunications network. The IMS server 124 may be external to the group of servers 130, in an example, where the IMS server 124 may be provided by a third party different than the service provider associated with the group of servers 130 and/or different from the cellular service provider. In one or more implementations, the IMS server 124 may facilitate one or more registration processes initiated by the electronic device 110 and performed by one or more servers of the group of servers 130, such as by querying and/or processing registration requests. The subject system allows the group of servers 130 and the electronic device 110 to perform some or all of the registration processes without facilitation from the IMS server 124. Although a single IMS server is discussed, multiple IMS servers may be utilized.

Figure 2:
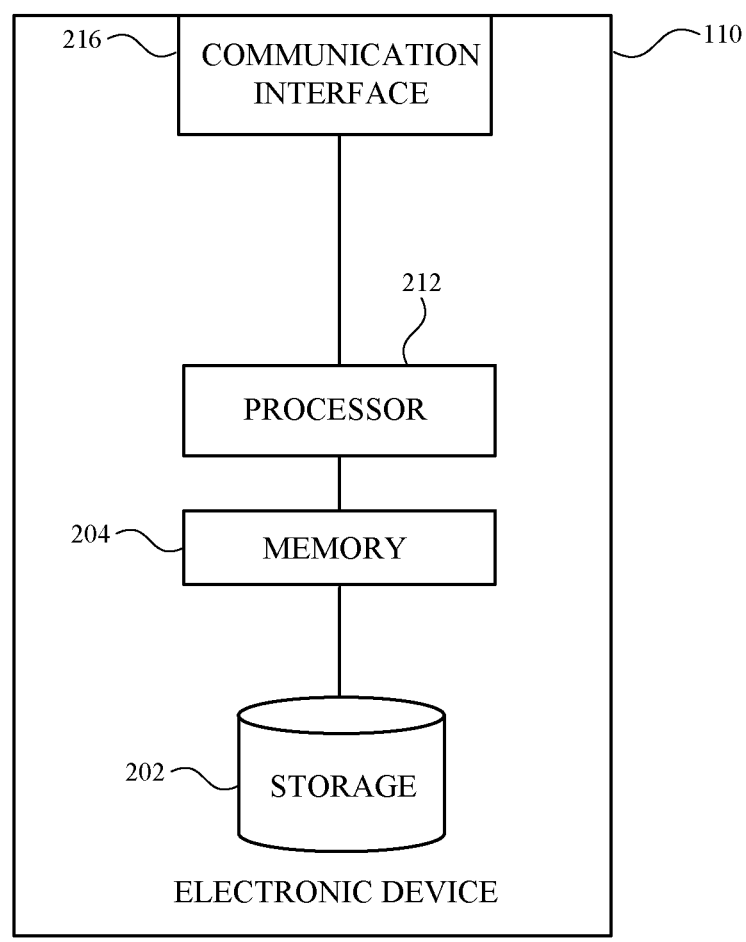
FIG. 2 illustrates a block diagram of an example electronic device, in accordance with one or more implementations.

FIG. 2 illustrates a block diagram of an example electronic device, in accordance with one or more implementations. For explanatory purposes, FIG. 2 is primarily described herein with reference to the electronic device 110 of FIG. 1. However, FIG. 2 may correspond to any of the electronic devices 110, 114 of FIG. 1. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The electronic device 102 may include a storage 202, a memory 204, a processor 212, and a communication interface 216. The storage 202 may correspond to a first type of memory, such as a non-volatile memory, including flash storage such as NAND flash and/or magnetic storage. The memory 204 may correspond to a second type of memory, such as a volatile memory, including dynamic random-access memory (DRAM). The memory 204 may include suitable logic, circuitry, and/or code that enable storage of various types of information such as received data, generated data, code, and/or configuration information.

The processor 212 may include suitable logic, circuitry, and/or code that enable processing data and/or controlling operations of the electronic device 110. In this regard, the processor 212 may be enabled to provide control signals to various other components of the electronic device 110. The processor 212 may also control transfers of data between various portions of the electronic device 110, including storage 202 and memory 204. Additionally, the processor 212 may enable implementation of an operating system or otherwise execute code to manage operations of the electronic device 110. The processor 212 may include general purpose processors, graphics processing units (GPUs), and/or specialized processors.

In one or more implementations, the memory 204 may store one or more applications for execution by processor 212 to access one or more services. As described below with respect to FIG. 3, the applications may utilize a temporary certificate stored in storage 202 to access the one of more services.

The communication interface 216 may include suitable logic, circuitry, and/or code that enables wired or wireless communication, such as between any of the electronic devices 110, 114 and one of more of the servers 120, 122, 124 over the network 106. The communication interface 216 may include, for example, one or more of a Bluetooth communication interface, a cellular interface, an NFC interface, a Zigbee communication interface, a WLAN communication interface, a USB communication interface, or generally any communication interface.

In one or more implementations, one or more of the processor 212, the storage 202, the memory 204, the communication interface 216, and/or one or more portions thereof, may be implemented in software (e.g., subroutines and code), may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both.

Figure 3:
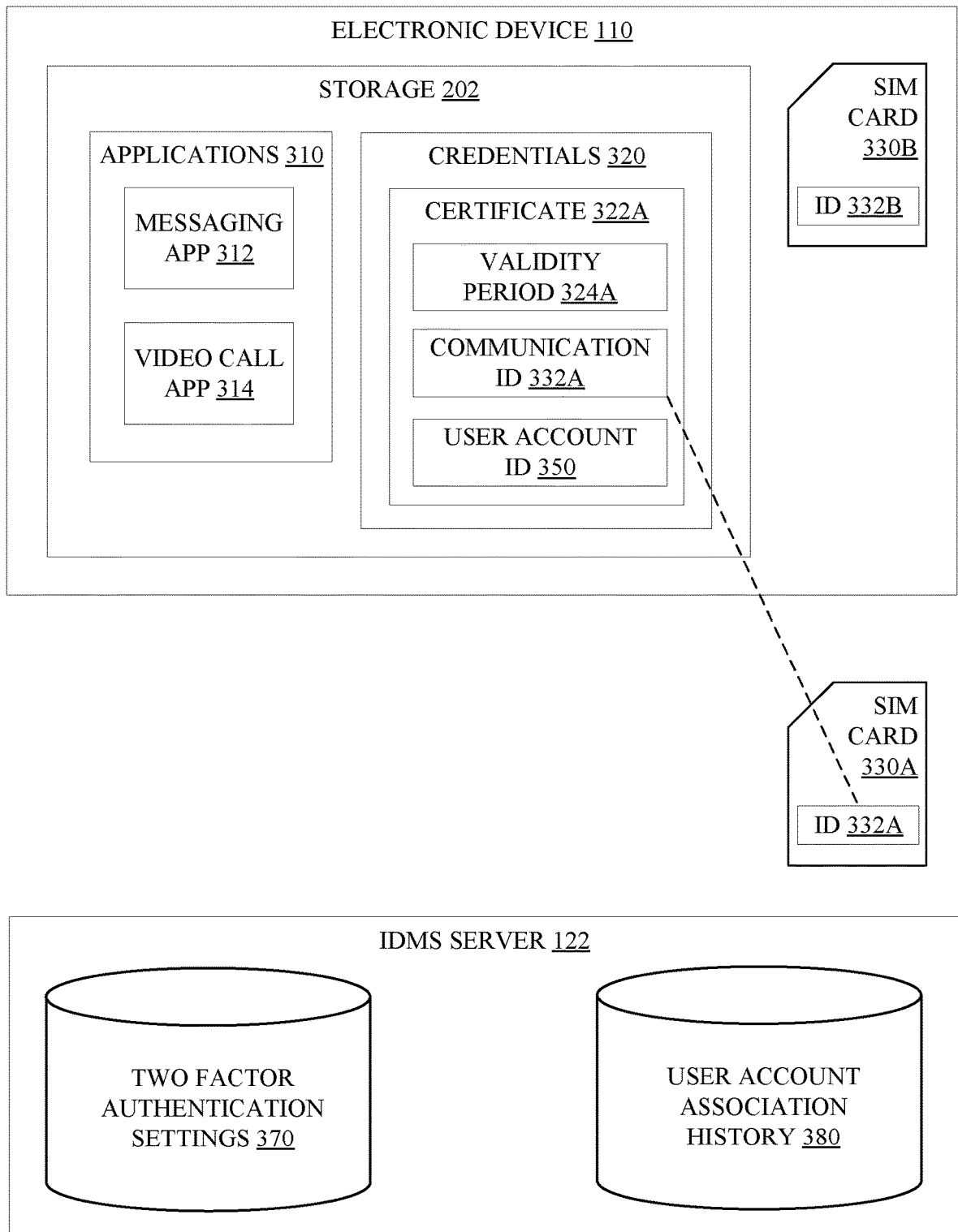
FIG. 3 illustrates block diagrams for an example electronic device, example SIM cards, and an example identity management services (IDMS) server, in accordance with one or more implementations.

FIG. 3 illustrates block diagrams for an electronic device 110, example SIM cards 330A and 330B, and an example identity management services (IDMS) server 122, in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

Electronic device 110 may load an application from applications 310 to access one or more communication services. For example, messaging app 312 may be loaded to access a messaging service, while video call app 314 may be loaded to access a video call service. The illustrated applications are exemplary and any number of communication services may be supported. SIM card 330B, associated with a communication identifier (ID) 332B, is inserted into electronic device 110 and made available for use by electronic device 110. For example, the communication ID 332B may be stored in a non-volatile memory of SIM card 330B. Communication ID 332B may uniquely identify a phone number that is based on one or more hardware identifiers, e.g., an ICC-ID (Integrated Circuit Card ID) of SIM card 330B. As discussed above, other identifiers such as eUIC-CID or IMSI may also be used for the hardware identifier. To identify the unique phone number associated with the hardware identifier(s), electronic device 110 may query IMS server 120 or another server to lookup a subscriber database using the hardware identifier(s). The results of the query may include a record that identifies the Mobile Station International Subscriber Directory Number (MSISDN) number, or the full phone number associated with the hardware identifier(s). Alternatively, the communication ID 332B may directly indicate the MSISDN number, in which case a subscriber database lookup may be omitted. For example, electronic device 110 may have previously stored an association of the hardware identifier(s) to the MSISDN number after verification with a subscriber database.

Thus, when SIM card 330B is available for use by electronic device 110, applications 310 may verify that electronic device 110 is authorized to use communication ID 332B and the associated phone number for accessing the communications services via applications 310. However, as discussed above, the user may have previously used a communication identifier 332A, corresponding to a primary number, that is associated with SIM card 330A previously used by electronic device 110 but no longer inserted into electronic device 110. While FIG. 3 is described with physical SIM cards, SIM card 330A and 330B may also be eSIM cards. In this case, SIM card 330A may still be present in electronic device 110 but deactivated, for example by assigning SIM card 330B as the active eSIM card. While SIM card 330B is inserted or active, the user may still desire to continue accessing the communication services using communication ID 332A rather than communication ID 332B.

To access the communication services using communication ID 332A, electronic device 110 may store a certificate 322A as a part of credentials 320 in storage 202. For example, the certificate may be a digitally signed flat file that is stored in non-volatile storage, or storage 202, and may include a public key of electronic device 110, a digital signature of IDS server 120, and various identifying fields such as validity period 324A defining a validity period of the certificate, communication ID 332A corresponding to a hardware identifier or MSISDN of SIM card 330A, and user account ID 350 corresponding to a user account used to login electronic device 110 with various servers to synchronize content, access services, and perform other tasks, as described above. The elements shown in certificate 322A are exemplary and may include additional elements not explicitly shown.

Before allowing access in association with a particular communication ID, communication services provided by IMS server 124 may request a proof of ownership of the particular communication ID, which may be provided by submitting certificate 322A in response to the request for proof. For example, the certificate 322A may be sent to the IMS server 124 via network 106, which can then verify the certificate with IDS server 120. Alternatively, the certificate 322A may be sent to the IDS server 120 via network 106, which then sends a verification result to IMS server 124. The verification may include confirming that validity period 324A is still valid, confirming the digital signature using the public key of IDS server 120, and confirming that user account ID 350 is logged into electronic device 110 and requesting to use communication ID 332A to access a service such as messaging or video calls. While only a single certificate 322A is shown, credentials 320 may include multiple certificates. For example, as discussed below, multiple certificates may be stored to operate in a dual-SIM operation mode.

Validity period 324A may define a predetermined time period when certificate 322A is valid, such as a period of 30 days after certificate generation, and thus also defines an expiration date for certificate 322A. In some implementations, validity period 324A may be capped to a maximum allowed validity period. In some implementations, electronic device 110 may provide a notification prior to the expiration of validity period 324A, for example 5 days prior to expiration. The notification may appear similar to the notification shown in FIG. 6, but instead informing of a future removal due to an expiration of validity period 324A rather than indicating a past or current removal due to receipt of an invalidation message. Certificate 322A may be potentially invalidated earlier than the period defined in validity period 324A, as described below in FIG. 6. Thus, certificate 322A is defined to be a temporary certificate with an expiration rather than a permanent certificate with no expiration, or a semi-permanent certificate with a much longer validity period. Communication ID 332A corresponds to the same communication ID 332A from the previously used SIM card 330A. User account ID 350 corresponds to a user account used to login electronic device 110 with various servers, as described above.

IDMS server 122 includes two factor authentication (2FA) settings 370 and user account association history 380, which may be used to determine whether a particular communication identifier is strongly tied to (e.g., satisfies an association criteria with) a particular user account. For example, IDMS server 122 may have previously received certificate 322A to confirm whether communication ID 332A is strongly tried to (e.g., satisfies an association criteria with) user account ID 350. IDMS server 122 may thus perform lookups in 2FA settings 370 and/or user account association history 380, for example to determine whether communication ID 332A is used for two-factor authentication for user account ID 350, and to determine how long communication ID 332A was associated with user account ID 350. If communication ID 332A is and/or has been used for two-factor authentication for user account ID 350, and/or if communication ID 332A was or has been associated with user account ID 350 for a predetermined amount of time, it may be determined that the communication ID 332A satisfies the association criteria with the user account. When IDMS server 112 is able to confirm that communication ID 332A is strongly tied to (e.g., satisfies an association criteria with) user account ID 350 based on the lookups, certificate 322A may be signed and stored into credentials 320 of storage 202. Exemplary processes for generating and storing certificate 322A are described below in FIG. 4 and FIG. 7. Note that while 2FA settings 370 and user account association history 380 are shown as internal components of IDMS server 122, in some implementations these components may be external components or a mix of internal and external components.

Certificate 322A attests to communication ID 332A being strongly tied to (e.g., satisfies the association criteria with), and therefore owned, by user account ID 350. Certificate 322A may be assumed to be continuously valid until the validity period 324A expires or an invalidation message is received, as discussed in FIG. 6. Accordingly, while certificate 322A is valid, certificate 322A can be presented by applications 310 of electronic device 110 to prove current and/or continued ownership of communication ID 332A even when SIM card 330A is not available for use by electronic device 110. For example, certificate 322A may be sent to a requesting server via network 106, as discussed above. A server providing access to communication services such as IMS server 124 may enable access in association with communication ID 332A when validity period 324A and a signature of certificate 322A can be confirmed to be valid.

Figure 4:
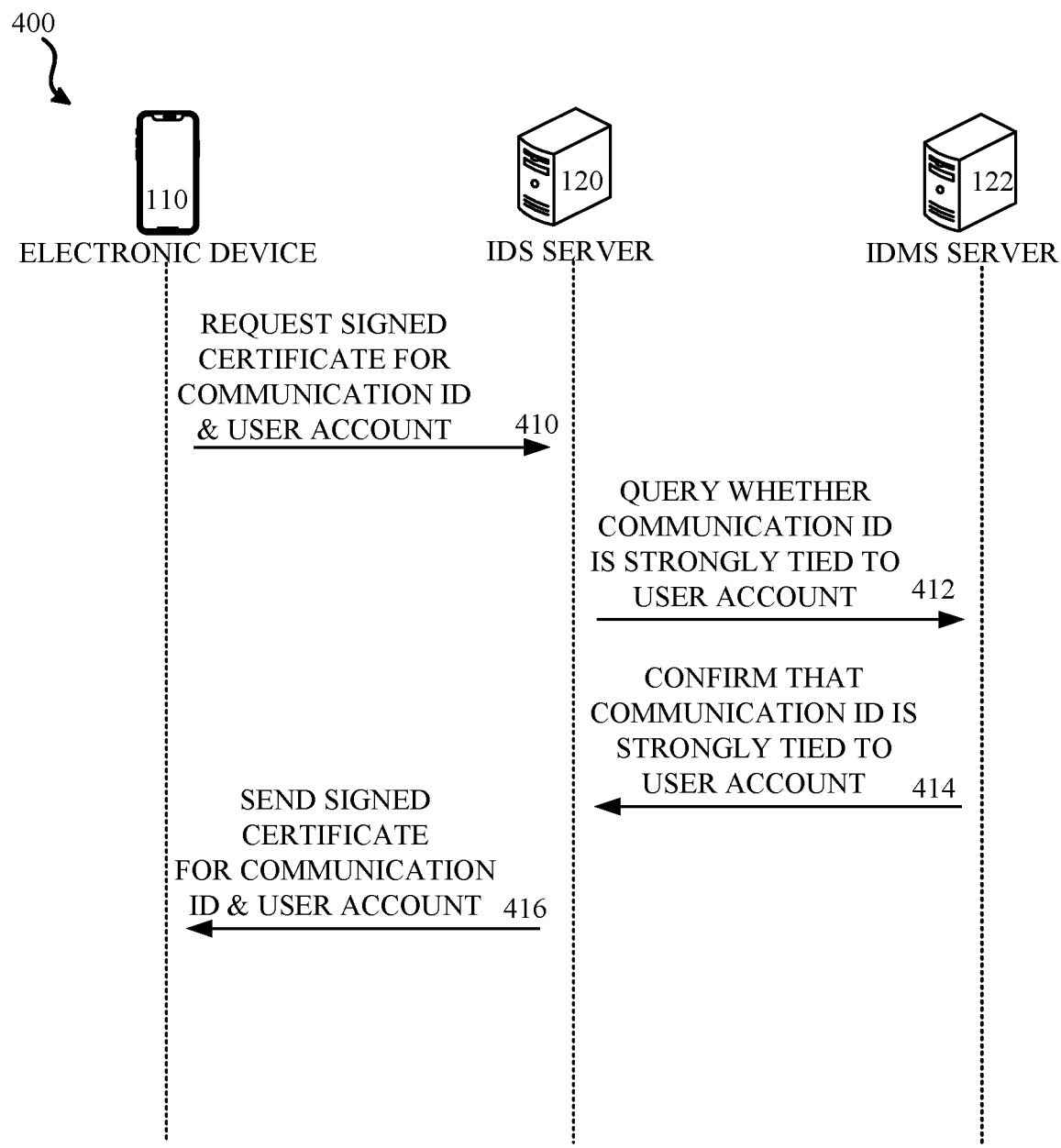
FIG. 4 illustrates an example sequence diagram for obtaining a temporary certificate that attests to continued ownership of a communication identifier by an electronic device associated with a user account, in accordance with one or more implementations.

FIG. 4 illustrates an example sequence diagram 400 for obtaining a temporary certificate that attests to current and/or continued ownership of a communication identifier by an electronic device associated with a user account, in accordance with one or more implementations. FIG. 4 is discussed with reference to components of FIG. 1, namely the electronic device 110, the IDS server 120, and the IDMS server 122. As shown, the diagram shows interactions between the electronic device 110, the IDS server 120, and the IDMS server 122. For explanatory purposes the temporary certificate signing is described herein with reference to the IDS server 120 and the IDMS server 122; however, the temporary certificate signing may be used by multiple different services, such as communication services, and the like. For example, an API may be provided that allows other services to utilize the temporary certificate signing system.

The electronic device 110 may initiate a request 410 to IDS server 120 for a signed certificate. The requested digital signature may be used as a way of establishing trust that an identified communication identifier is strongly tied to an identified user account. For example, since the IDS server 120 may perform a subscriber database lookup to identify the phone number associated with the communication identifier, and since IDS server 120 may also query 412 to confirm with IDMS server 122 that the phone number associated with the communication ID is strongly tied to (e.g., satisfies an association criteria with) the user account (e.g. by confirming use of the primary number for 2FA to authenticate the user account and/or a threshold login time of the user account on the electronic device 110), the signature of IDS server 120 establishes that these factors were confirmed by IDS server 120, since only IDS server 120 knows the private key for providing its digital signatures. The request 410 may thus include an unsigned version of certificate 322A from FIG. 3. In some implementations, a batch protocol is used to sign multiple certificates in a single request. In some examples, the request 410 includes the authentication batch request.

The IDS server 120 may extract the data from certificate 322A and submit a query 412 to the IDMS server 122 whether the communication ID 332A satisfies an association criteria with (e.g., is strongly tied to) the user account ID 350. The IDMS server 122, for example, may perform a lookup in 2FA settings 370 to determine whether communication ID 332A is registered for 2FA for user account ID 350. If communication ID 332A is registered for 2FA, then this may provide evidence that communication ID 332A satisfies the association criteria with (e.g., is strongly tied to) user account ID 350. Similarly, the IDMS server 122 may perform a lookup in user account association history 380 to determine a length of time in which electronic device 110 had SIM card 330A available to use while logged in or registered under user account ID 350. If this length of time exceeds a threshold, such as at least 3 days, then this may also provide evidence that communication ID 332A satisfies the association criteria with (e.g., is strongly tied to) user account ID 350. This evidence and/or other factors may be used by IDMS server 112 to confirm 414 that communication ID 332A satisfies the association criteria with (e.g., is strongly tied to) user account ID 350.

IDS server 120, upon receiving the confirm 414, may proceed to sign certificate 322A and send 416 the signed certificate 322A back to electronic device 110. For example, IDS server 120 may process the data fields of certificate 322A using its private key to generate and append cryptographic data, such as a cryptographic digest message, to the certificate 322A, such that other devices such as electronic device 110 or IMS server 124 can use an associated public key to decrypt and verify that the cryptographic digest message, or digital signature, is valid. Thus, the previously unsigned certificate is now signed by appending the cryptographic digest message. The signed certificate 322A may be stored within credentials 320 in storage 202. When certificate 322A is invalidated or validity period 324A expires, then certificate 322A may be deleted from credentials 320. For example, SIM card 330A may be inserted into a different device, such as electronic device 114. In this case, electronic device 114 has established intervening ownership of communication ID 332A. Electronic device 110 may receive an invalidation message by periodically querying IDS server 120 or IMS server 124, or by receiving a push message, and electronic device 110 may invalidate and delete certificate 322A from credentials 320 in response to the message.

Figure 5:
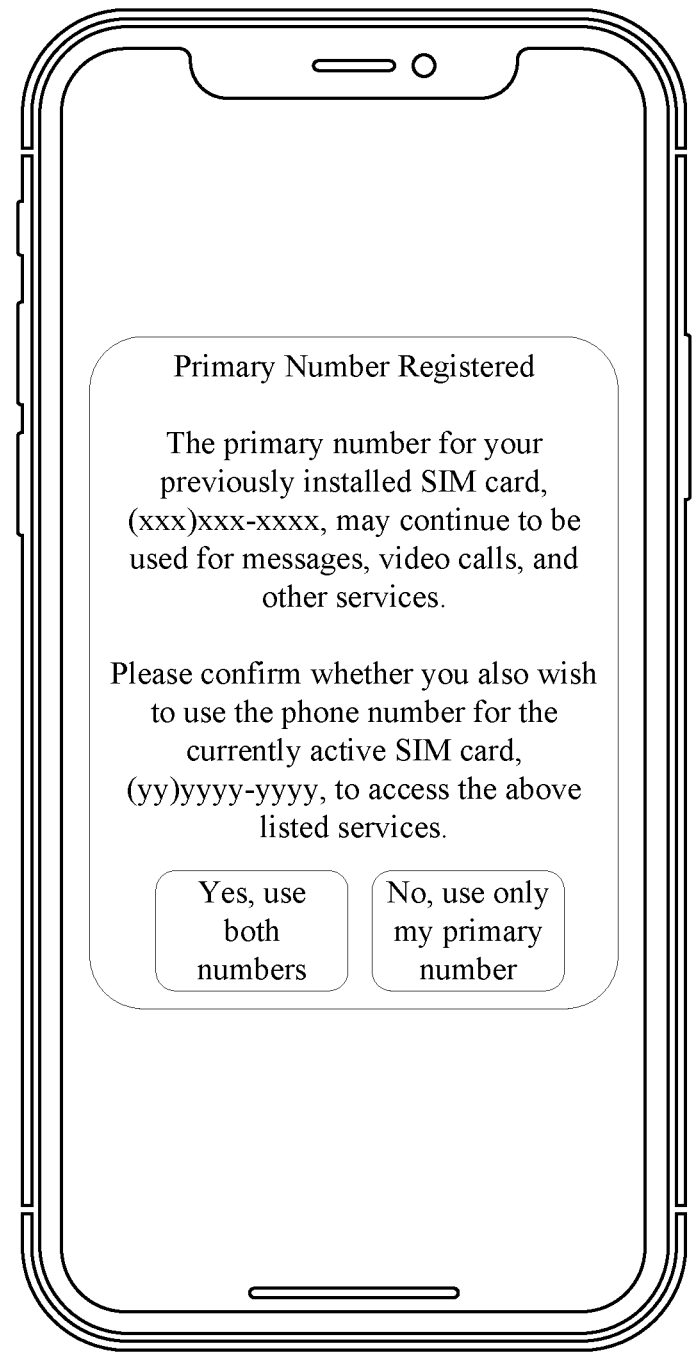
FIG. 5 illustrates an example notification interface for successful registration of a primary number associated with a previously used SIM card and for confirming entry into a dual-SIM operation mode, in accordance with one or more implementations.

FIG. 5 illustrates an example notification interface for successful registration of a primary number associated with a previously used SIM card and for confirming entry into a dual-SIM operation mode, in accordance with one or more implementations. The notification interface of FIG. 5 may appear after an occurrence of sequence diagram 400. As shown in FIG. 5, certificate 322A may be generated automatically by electronic device 110 on behalf of the user when conditions for generating certificate 322A are met. One of the conditions may include that the SIM card 330B is inserted or made available for use within a predetermined time after SIM card 330A is removed or made unavailable to electronic device 110.

As shown in FIG. 5, the user is informed that the primary number, or communication ID 332A (associated with phone number "xxx-xxx-xxxx"), can continue to be used to access messages, corresponding to messaging app 312, and to access video calls, corresponding to video call app 314. Further, the user is prompted whether to use the new number, or communication ID 332B (associated with phone number "yyy-yyy-yyyy"), for accessing the same services. As discussed above, the phone number associated with a particular communication ID may be determined by performing a subscriber database lookup. Since SIM card 330B may only be a temporary, e.g. rental, card, the user may not wish to use communication ID 332B for messages and video calls, in which case the user may select the "No" option. In this case, SIM card 330B may still be used for cellular voice calls and data connectivity, but communication ID 332B may be ignored when accessing services using applications 310.

In the case that the user does wish to use both numbers and selects the "Yes" option, then the electronic device 110 may enter into a dual-SIM mode for applications 310. Messaging app 312 and video call app 314 may therefore access respective messaging services and video call services using either communication ID 332A or 332B. In this case, an additional certificate may be stored in credentials 320 for the communication ID 332B using a process similar to that shown in sequence diagram 400. However, since the SIM card 330B is inserted and available to electronic device 110, a check whether communication ID 332B is strongly tied to user account ID 350 may be bypassed. Thus, in some implementations, IDS server 120 can sign the additional certificate without sending the query 412 to IDMS server 122.

Figure 6:
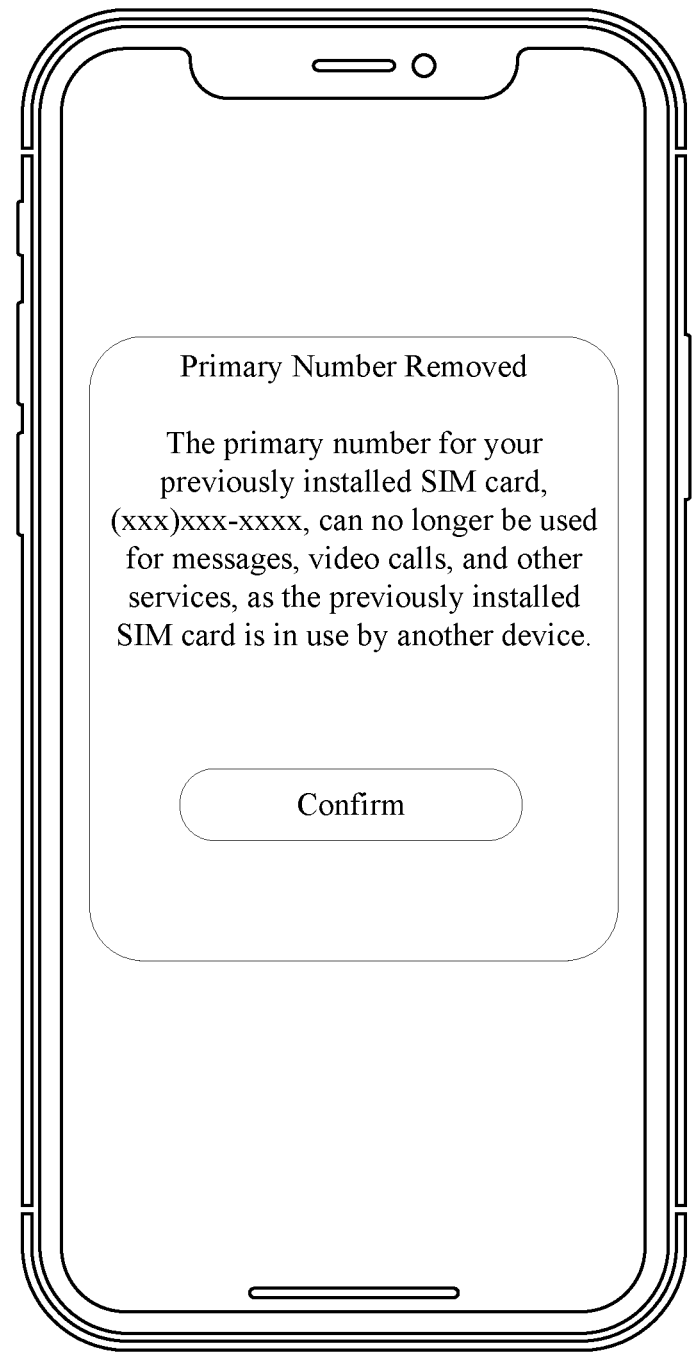
FIG. 6 illustrates an example notification interface for invalidation of a primary number associated with a previously used SIM card, in accordance with one or more implementations.

FIG. 6 illustrates an example notification interface for invalidation of a primary number associated with a previously used SIM card, in accordance with one or more implementations. As discussed above, certificate 322A may be invalidated prior to validity period 324A due to receiving an invalidation message. In the example illustrated in FIG. 6, SIM card 330A has been inserted into another electronic device, which now has an intervening and/or superior claim of ownership to the associated communication ID 332A. Thus, certificate 322A may be deleted from credentials 320. Another invalidating event may include changing the 2FA number registered for user account ID 350 from communication ID 332A to a different ID, which causes communication ID 332A to be weakly tied user account ID 350. Yet another invalidating event may be a failed confirmation of a heartbeat interval, where electronic device 110 polls a server, such as IDS server 120 or IMS server 124, for continued validity of certificate 322A using a heartbeat interval that is shorter than the validity period 324A. In other implementations, a settings user interface may be provided for the user to expressly delete certificate 322A. To obtain a new certificate with an extended validity period after certificate 322A expires, the SIM card 330A can be re-inserted into electronic device 110 to reestablish ownership.

Figure 7:
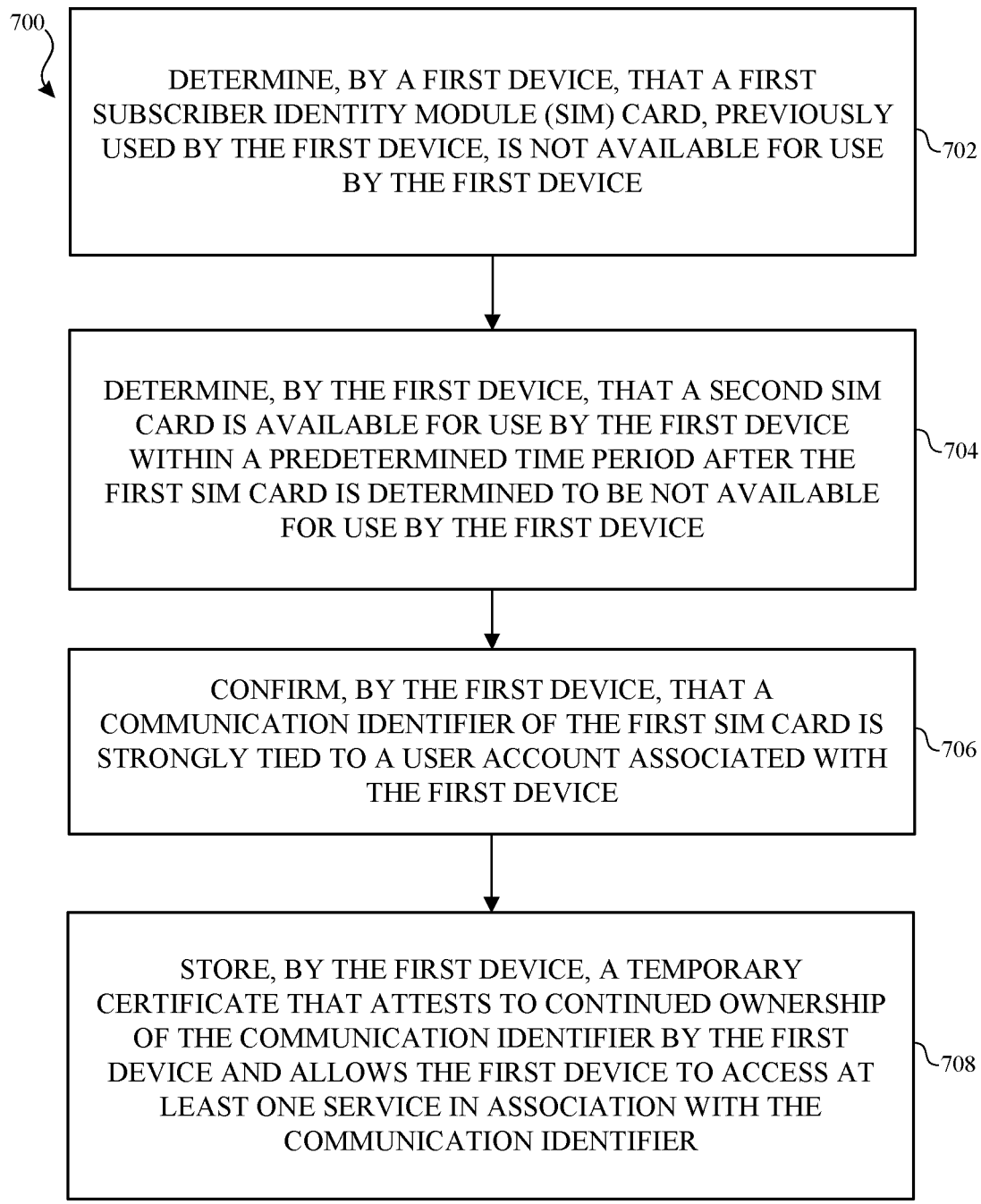
FIG. 7 illustrates a flow diagram of an example process for storing a temporary certificate on a device for accessing services in association with a primary number, in accordance with one or more implementations.

FIG. 7 illustrates a flow diagram of an example process 700 for storing a temporary certificate on a device for accessing services in association with a primary number, in accordance with one or more implementations. For explanatory purposes, the process 700 is primarily described herein with reference to the electronic device 110 of FIG. 1-4. However, the process 700 is not limited to the electronic device 110 of FIGS. 1-4, and one or more blocks (or operations) of the process 700 may be performed by one or more other components of other suitable devices. Further for explanatory purposes, the blocks of the process 700 are described herein as occurring in serial, or linearly. However, multiple blocks of the process 700 may occur in parallel. In addition, the blocks of the process 700 need not be performed in the order shown and/or one or more blocks of the process 700 need not be performed and/or can be replaced by other operations.

In the example process 700, at block 702, a first device (e.g., the electronic device 110) determines that a first SIM card (e.g., the SIM card 330A), previously used by the first device, is not available for use by the first device. For example, electronic device 110 may store a history of previously used SIM cards, including SIM card 330A, within storage 202, and confirm that a currently inserted (and/or available) SIM card does not correspond to SIM card 330A.

At block 704, the electronic device 110 determines that a second SIM card (e.g., the SIM card 330B) is available for use by the electronic device 110 within a predetermined time period after the SIM card 330A is determined to be not available for use by the electronic device 110. For example, after detecting an insertion of SIM card 330B, electronic device 110 may confirm that SIM card 330B is available for use (e.g. correctly responds to electronic commands and/or provides access to a telecommunications network) and also confirm that an elapsed time between removal of the previous SIM card 330A and the insertion of the SIM card 330B is within the predetermined time period, for example within a week.

At block 706, the electronic device 110 confirms that a communication ID 332A of SIM card 330A is strongly tied to (e.g., satisfies an association criteria with) a user account (e.g., the user account ID 350) associated with the electronic device 110. For example, an unsigned certificate 322A may be generated that includes the communication ID 332A and the user account ID 350, which may then processed through sequence diagram 400 as described above in FIG. 4. Upon receipt of a signed certificate 322A, the electronic device 110 may confirm that the communication ID 332A of SIM card 330A is strongly tied to (e.g., satisfies an association criteria with) the user account ID 350.

At block 708, the electronic device 110 stores the signed certificate 322A into credentials 320 of storage 202. The signed certificate 322A attests to electronic device 110 current and/or continuing to own communication ID 332A. The signed certificate 322A can be presented by the applications 310 in lieu of SIM card 330A to access one or more services in association with communication ID 332A.

Figure 8:
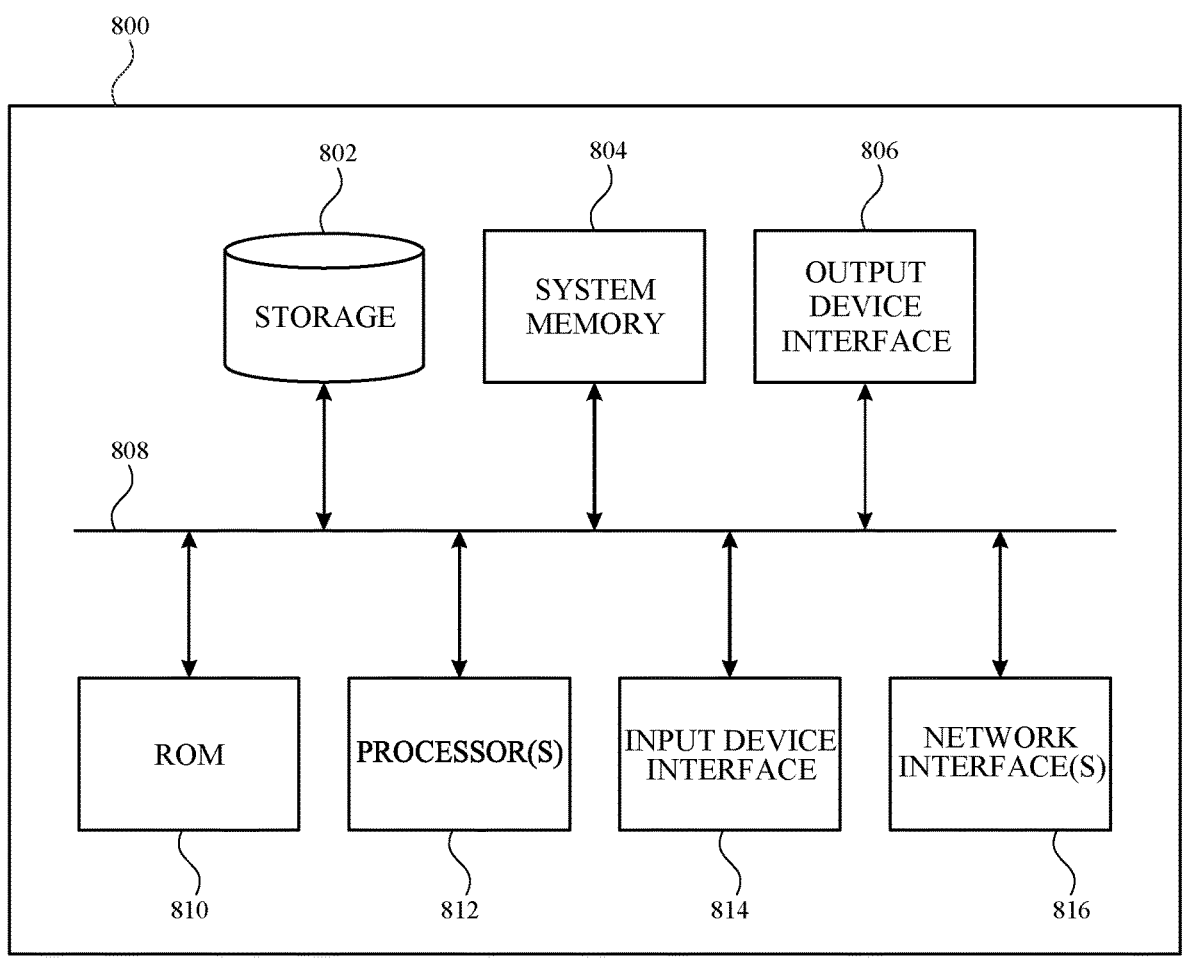
FIG. 8 illustrates an electronic system with which one or more implementations of the subject technology may be implemented.

FIG. 8 illustrates an electronic system 800 with which one or more implementations of the subject technology may be implemented. The electronic system 800 can be, and/or can be a part of, one or more of the electronic devices 110, 114, the IDS server 120, the IDMS server 122, and/or the IMS server 124, as shown in FIG. 1. The electronic system 800 may include various types of computer readable media and interfaces for various other types of computer readable media. The electronic system 800 includes a bus 808, one or more processing unit(s) 812, a system memory 804 (and/or buffer), a ROM 810, a permanent storage device 802, an input device interface 814, an output device interface 806, and one or more network interfaces 816, or subsets and variations thereof.

The bus 808 collectively represents all system, peripheral, and chipset buses that communicatively connect the numerous internal devices of the electronic system 800. In one or more implementations, the bus 808 communicatively connects the one or more processing unit(s) 812 with the ROM 810, the system memory 804, and the permanent storage device 802. From these various memory units, the one or more processing unit(s) 812 retrieves instructions to execute and data to process in order to execute the processes of the subject disclosure. The one or more processing unit(s) 812 can be a single processor or a multi-core processor in different implementations.

The ROM 810 stores static data and instructions that are needed by the one or more processing unit(s) 812 and other modules of the electronic system 800. The permanent storage device 802, on the other hand, may be a read-and-write memory device. The permanent storage device 802 may be a non-volatile memory unit that stores instructions and data even when the electronic system 800 is off. In one or more implementations, a mass-storage device (such as a magnetic or optical disk and its corresponding disk drive) may be used as the permanent storage device 802.

In one or more implementations, a removable storage device (such as a floppy disk, flash drive, and its corresponding disk drive) may be used as the permanent storage device 802. Like the permanent storage device 802, the system memory 804 may be a read-and-write memory device. However, unlike the permanent storage device 802, the system memory 804 may be a volatile read-and-write memory, such as random access memory. The system memory 804 may store any of the instructions and data that one or more processing unit(s) 812 may need at runtime. In one or more implementations, the processes of the subject disclosure are stored in the system memory 804, the permanent storage device 802, and/or the ROM 810. From these various memory units, the one or more processing unit(s) 812 retrieves instructions to execute and data to process in order to execute the processes of one or more implementations.

The bus 808 also connects to the input and output device interfaces 814 and 806. The input device interface 814 enables a user to communicate information and select commands to the electronic system 800. Input devices that may be used with the input device interface 814 may include, for example, alphanumeric keyboards and pointing devices (also called "cursor control devices"). The output device interface 806 may enable, for example, the display of images generated by electronic system 800. Output devices that may be used with the output device interface 806 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 8, the bus 808 also couples the electronic system 800 to one or more networks and/or to one or more network nodes, such as the electronic device 110 shown in FIG. 1, through the one or more network interface(s) 816. In this manner, the electronic system 800 can be a part of a network of computers (such as a LAN, a wide area network ("WAN"), or an Intranet, or a network of networks, such as the Internet. Any or all components of the electronic system 800 can be used in conjunction with the subject disclosure.

As described above, one aspect of the present technology is the gathering and use of data available from specific and legitimate sources to improve registering and associating multiple user identifiers for a service on a device. The present disclosure contemplates that in some instances, this gathered data may include personal information data that uniquely identifies or can be used to identify a specific person. Such personal information data can include demographic data, location-based data, online identifiers, telephone numbers, email addresses, home addresses, data or records relating to a user's health or level of fitness (e.g., vital signs measurements, medication information, exercise information), date of birth, or any other personal information.

The present disclosure recognizes that the use of such personal information data, in the present technology, can be used to the benefit of users. For example, the personal information data can be used to determine whether to register and/or associate a particular user identifier in accordance with a user's preferences. Accordingly, use of such personal information data enables users to have greater control of the devices for which user identifiers are registered. Further, other uses for personal information data that benefit the user are also contemplated by the present disclosure. For instance, health and fitness data may be used, in accordance with the user's preferences to provide insights into their general wellness, or may be used as positive feedback to individuals using technology to pursue wellness goals.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominently and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations which may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of registering and associating multiple user identifiers for a service on a device, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, registered and/or associated user identifiers can be provided based on aggregated non-personal information data or a bare minimum amount of personal information, such as the information being handled only on the user's device or other non-personal information available.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

The subject technology provides for storing a temporary certificate on a mobile device for accessing services in association with a primary number. A communication identifier associated with a previously used SIM card is identified to be strongly associated with a user account of the mobile device. For example, the user account may be registered at one or more servers used to login and authenticate a specific user of the mobile device. Once the communication ID is identified to be strongly associated with the user account associated with the mobile device, a temporary certificate attesting to the association is stored on the mobile device. When the mobile device is requested to prove ownership of the primary number to access a service, the temporary certificate can be provided to attest to continued ownership of the primary number after the previously used SIM card is not available to the mobile device. Thus, the subject technology allows a user to advantageously continue using the primary number to access various services such as messaging and video calls even when a different SIM card is inserted or a different eSIM card is activated by the mobile device.

According to various implementations, a method for enabling the use of a communication identifier from a previously used subscriber identity module (SIM) card to access a service is provided. The method may include determining, by a first device, that a first subscriber identity module (SIM) card, previously used by the first device, is not available for use by the first device. The method may include determining, by the first device, that a second SIM card is available for use by the first device within a predetermined time period after the first SIM card is determined to be not available for use by the first device. The method may include confirming, by the first device, that a communication identifier of the first SIM card is strongly tied to a user account associated with the first device. The method may include storing, by the first device, a temporary certificate that attests to continued ownership of the communication identifier by the first device and allows the first device to access at least one service in association with the communication identifier.

Other aspects include corresponding systems, apparatuses, and computer program products for implementation of the computer-implemented method.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some implementations, one or more implementations, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other implementations. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method, comprising:
   determining, by a first device, that a first subscriber identity module (SIM) card, previously used by the first device, is not available for use by the first device;
   determining, by the first device, that a second SIM card is available for use by the first device within a predetermined time period after the first SIM card is determined to be not available for use by the first device;
   confirming, by the first device, that a communication identifier of the first SIM card satisfies an association criteria with a user account that is associated with the first device; and
   storing, by the first device, a temporary certificate that attests to current ownership of the communication identifier by the first device and allows the first device to access at least one service in association with the communication identifier.

2. The method of claim 1, further comprising:
   receiving, by the first device, a request for proof of ownership of the communication identifier;
   sending, by the first device, the temporary certificate in response to receiving the request; and
   after sending the temporary certificate, accessing, by the first device, using the second SIM card, the at least one service in association with the communication identifier.

3. The method of claim 2, further comprising:
   after sending the temporary certificate, receiving, by the first device, a message directed to the communication identifier via the at least one service.

4. The method of claim 1, wherein the at least one service comprises a messaging service, wherein the messaging service is configured to allow the first device and a second device, different from the first device, to communicate by sending and receiving messages.

5. The method of claim 1, wherein confirming that the communication identifier of the first SIM card satisfies the association criteria with the user account associated with the first device comprises confirming that:
   the communication identifier is registered for two-factor authentication of the user account, or
   the communication identifier has been associated with the user account for a threshold period of time.

6. The method of claim 1, further comprising:
   storing, by the first device, another temporary certificate that attests to current ownership of another communication identifier of the second SIM card by the first device and allows the first device to access the at least one service in association with both the communication identifier and the other communication identifier.

7. The method of claim 1, wherein the temporary certificate is associated with a predetermined expiration period after which the temporary certificate expires and is not valid.

8. The method of claim 7, further comprising:
   displaying, by the first device, an expiration notification prior to the predetermined expiration period.

9. The method of claim 7, further comprising:
   confirming, by the first device, a continued validity of the temporary certificate by polling a server using a heartbeat interval that is shorter than the predetermined expiration period.

10. The method of claim 7, further comprising:
    updating, by the first device, based on determining that the first SIM card is again available for use by the first device after determining that the first SIM card is not available for use by the first device, the stored temporary certificate with another temporary certificate having an extended predetermined expiration period.

11. The method of claim 1, further comprising:
    receiving, by the first device, an invalidation message corresponding to the communication identifier; and
    invalidating, by the first device, the stored temporary certificate in response to receiving the invalidation message.

12. A first device, comprising:
    a memory; and
    one or more processors configured to:
        determine that a first subscriber identity module (SIM) card, previously used by the first device, is not available for use by the first device;
        determine that a second SIM card is available for use by the first device within a predetermined time period after the first SIM card is determined to be not available for use by the first device;
        confirm that a communication identifier of the first SIM card satisfies an association criteria with a user account that associated with the first device; and store a temporary certificate that attests to current ownership of the communication identifier by the first device and allows the first device to access at least one service in association with the communication identifier.

13. The first device of claim 12, wherein the one or more processors are further configured to:
   receive a request for proof of ownership of the communication identifier;
   send the temporary certificate in response to receiving the request; and
   after sending the temporary certificate, access, using the second SIM card, the at least one service in association with the communication identifier.

14. The first device of claim 12, wherein the one or more processors are further configured to:
   after sending the temporary certificate, receive a message directed to the communication identifier via the at least one service.

15. The first device of claim 12, wherein the at least one service comprises a messaging service, wherein the messaging service is configured to allow the first device and a second device, different from the first device, to communicate by sending and receiving messages.

16. The first device of claim 12, wherein the one or more processors are configured to confirm that the communication identifier of the first SIM card satisfies the association criteria with the user account associated with the first device at least in part by confirming that:
   the communication identifier is registered for two-factor authentication of the user account, or
   the communication identifier is associated with the user account for a threshold period of time.

17. The first device of claim 12, wherein the one or more processors are further configured to:
   store another temporary certificate that attests to current ownership of another communication identifier of the second SIM card by the first device and allows the first device to access the at least one service in association with both the communication identifier and the other communication identifier.

18. The first device of claim 12, wherein the temporary certificate is associated with a predetermined expiration period after which the temporary certificate expires and is not valid.

19. The first device of claim 12, wherein the one or more processors are further configured to:
   receive an invalidation message corresponding to the communication identifier; and
   invalidate the stored temporary certificate in response to receiving the invalidation message.

20. A non-transitory machine-readable medium storing instructions that, when executed by one or more processors, cause the one or more processors to:
   determine that a first subscriber identity module (SIM) card, previously used by a first device, is not available for use by the first device;
   determine that a second SIM card is available for use by the first device within a predetermined time period after the first SIM card is determined to be not available for use by the first device;
   confirm that a communication identifier of the first SIM card satisfies an association criteria with a user account that is associated with the first device; and
   store a temporary certificate that attests to current ownership of the communication identifier by the first device and allows the first device to access at least one service in association with the communication identifier.

* * * * *